United States Patent [19]

Lienhard

[11] 3,723,983

[45] Mar. 27, 1973

[54] HIGH DENSITY THIN FILM REGISTER

[75] Inventor: Heinz Lienhard, Palo Alto, Calif.

[73] Assignee: Ampex Corporation, Redwood City, Calif.

[22] Filed: Mar. 19, 1971

[21] Appl. No.: 126,309

Related U.S. Application Data

[63] Continuation of Ser. No. 761,054, Sept. 20, 1968, abandoned.

[52] U.S. Cl. .340/174 MC, 340/174 SR, 340/174 TF

[51] Int. Cl. ..........................G11c 11/14, G11c 19/00

[58] Field of Search ...340/174 MC, 174 SR, 174 FB, 340/174 TF

[56] References Cited

UNITED STATES PATENTS

| | | | |
|---|---|---|---|
| 3,438,006 | 4/1969 | Spain | 340/174 TF |
| 3,508,225 | 4/1970 | Smith | 340/174 TF |

*Primary Examiner*—Stanley M. Urynowicz, Jr.
*Attorney*—Robert G. Clay

[57] ABSTRACT

Improved magnetic thin film geometry for use in shift registers, etc., wherein the thin film strips, and thus the magnetic domains, have a preselected width to length (W/L) ratio, film thickness (T), and value of coercive force ($H_c$). The geometry provides storage and transfer of stable magnetic domains with well-defined boundaries, and decreased interaction and spurious nucleation, while allowing relatively high packing densities. The parameters are chosen as to maximize ($H_N - H_W$) where $H_W$ is the magnetic domain nucleation field, $H_N$ is the magnetic domain wall threshold field, and $H_N - H_W$ is the operational margin of the film strip. By suitably selecting the above parameters, optimum packing density and speed of domain wall motion, with stable domain storage conditions, are realized.

5 Claims, 8 Drawing Figures

Patented March 27, 1973 3,723,983

INVENTOR.
HEINZ LIENHARD

BY Robert G. Clay

ATTORNEY

HIGH DENSITY THIN FILM REGISTER

This is a continuation application of the parent application Ser. No. 761,054 filed Sept. 20, 1968 now abandoned.

BACKGROUND OF THE INVENTION

1. Field of the Invention

The invention relates to thin film memories and/or registers, and more particularly to an improved thin film strip geometry for use in registers having relatively high bit packing densities and high operating speed.

2. Description of the Prior Art

Various straight line thin film register geometries are known in the art, such as those described, for example, in U.S. Pat. Nos. 2,919,432 issued Dec. 29, 1959 and U.S. Pat. No. 3,092,813 issued June 4, 1963, to K. D. Broadbent. Such straight line geometries provide a relatively simple configuration which operates successfully, wherein however, the devices show a low margin of reliable operation and poor packing density. This is generally due to the fact that the domains of reversed magnetization in a uniaxial thin film strip have ill-defined magnetic boundaries and tend to interact when in close proximity, such as occurs when attempting to increase the packing densities of such prior art straight line registers. Further, spurious nucleation of unwanted domains due to insufficient reset of a domain is another effect which severely limits the reliable operation of prior art straight line magnetic shift registers which utilize the controlled domain wall motion concept, such as those described in the above mentioned patents.

Other prior art devices utilize a zig-zag or staggered thin film geometry wherein each domain is stored in respective domain sites, or elements, of the thin film. This provides complete isolation between the domains and thus a reduction in interaction therebetween, while allowing an increase in packing densities over those possible in straight line geometries. Such zig-zag configurations are shown and described, for example, in copending U.S. Patent applications, Ser. Nos. 387,427 to I.W. Wolf filed Aug. 4, 1964, now U.S. Pat. No. 3,417,385 and 565,623 to A. A. Jaecklin filed July 15, 1966, now U.S. Pat. No. 3,474,425 both applications being assigned to the assignee of this application. In this zig-zag thin film configuration, optimum separation of domains is achieved. However, the zig-zag design provides the disadvantage of interrupted film edges as when employing "soft" film windows within a "hard" film boundary, which in turn, creates magnetic poles and enhances demagnetization effects. This tends to limit the minimum size of each site window, which in turn, limits the maximum packing density of the configuration.

SUMMARY OF THE INVENTION

The present invention provides the advantages of both the straight line and the zig-zag thin film geometries, e.g., higher densities, while circumventing the disadvantages of both, e.g., domain interaction and spurious nucleation. Thus, in the invention the domains are confined preferably to straight line "soft" film strips of relatively narrow width within "hard" film boundaries, or may be confined within straight "soft" film disposed on a suitable substrate without the "-hard" boundaries. In accordance with the invention, the width to length ratio (W/L) is chosen much smaller than conventional in prior art straight line thin film geometries.

By way of example only, when a soft film window is made sufficiently narrow, the hard film of the composite film strip begins to interact with the domains in accordance with the invention concept. That is, decreasing the width of the thin film tends to increase $\Delta H$, which is equal to $H_c^+ - H_c^-$ and is the relationship of apparent coercive forces in the specific case of hard film interaction. $H_c^+$ is the threshold to expand a domain ($H_c^+ > H_c$) and $H_c$ is the threshold to shrink it ($H_c^- < H_c$). With $|H_c^+| > |H_c^-|$ the operational margin is again increased. The invention concepts may be applied to both single film strips and/or various partial or fully closed flux structures such as described hereinafter.

BRIEF DESCRIPTION OF THE PREFERRED EMBODIMENTS

FIG. 1 represents the prior art configuration, FIGS. 2–4 represent various intermediate experimental configurations, and FIG. 5 represents the preferred invention configuration.

DESCRIPTION OF THE PREFERRED EMBODIMENTS

Figure 1:
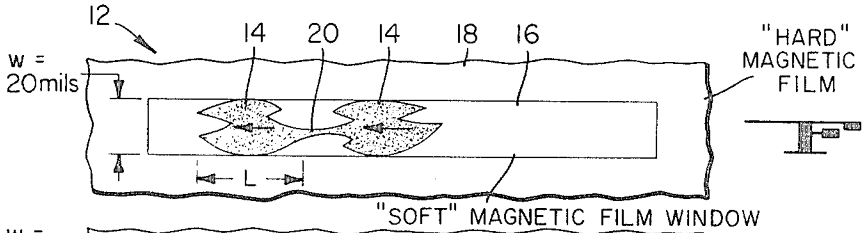
FIGS. 1–5 are a succession of simplified views depicting pictorially the effect of providing a decreased width to length ratio of a straight line thin film geometry.

As depicted in FIG. 1, a thin film structure 12 such as utilized in prior art thin film registers, employs a relatively wide thin film strip configuration. Magnetic domains 14 are depicted confined in the structure 12, and particularly in a "soft" film strip 16 which extends between "hard" film boundaries 18 of the particular structure shown. The domains 14 have a relatively large width to length ratio (W/L) and accordingly there is a large degree of interaction between the domains 14 as shown by the extended walls therebetween, indicated herein by numeral 20.

It is to be understood that although the present invention is herein described with relation to soft magnetic film windows disposed within a hard magnetic film, various other known straight line film configurations and structures may be utilized.

Figure 2:
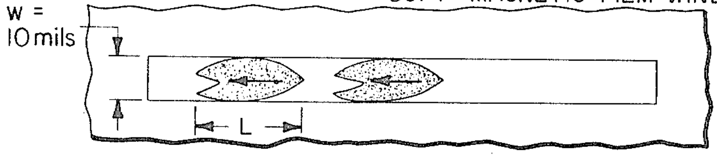
Figure 3:
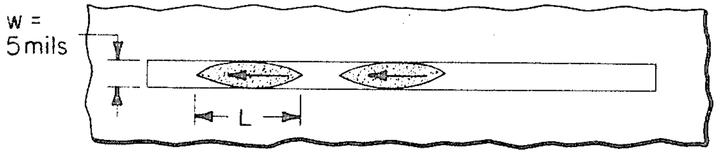
Figure 4:
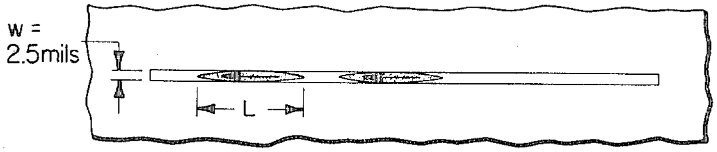
Figure 5:
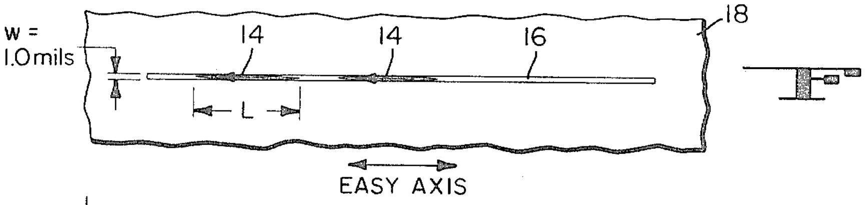

As the width of the structure 12 is narrowed, viz., as the soft magnetic film window or strip 16 is narrowed, as sequentially depicted in FIGS. 2–4, the W/L ratio of the domains 14 is decreased, causing a decrease in the degree of interaction between adjacent domains. In accordance with the invention concepts, when the W/L ratio is made narrow enough, i.e., when the ratio is chosen less than a selected value as particularly true in FIG. 5, the value being determined by various parameters further described hereinbelow, the hard film boundaries begin to interact with the domains 14. The lowest possible energy state occurs when the magnetization is parallel throughout the entire film structure. A domain 14 in the narrow strip 16 of the invention, as shown in FIG. 5, constitutes high local energy density. The hard film boundaries 18 therefore oppose the expansion of a domain but favor the reset.

In a continuous magnetic film, a threshold magnetic field for domain wall motion may be measured. This field is the force $H_c$. As a consequence of the hard film boundary interaction with the domain, two different $H_c$ values are found in the soft film window; $H_c^+$which expands the domains ($H_c^+ > H_c$) and $H_c^-$which shrinks or cancels a domain ($H_c^- < H_c$). Defining $\Delta H = H_c^+ - H_c^-$, ΔH increases with smaller widths W of the strip 16. The virtue of such an increased ΔH is a clean reset of the domains 14, which precludes the generation of an unwanted domain and thus of a false bit of information.

Figure 6:
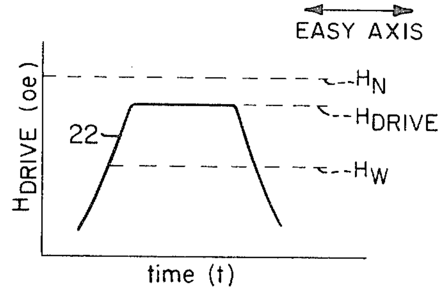
FIG. 6 is a graph depicting the operational margin $H_N - H_W$ and its relation to a driving pulse of amplitude $H_{drive}$. By exceeding $H_N$ unwanted domains would be created; below $H_W$ proper shifting is impossible.

In any thin film register, it is highly desirable to maximize the packing densities which in turn improves the speed ($\sigma$) of domain wall motion. Accordingly, it is desirable to increase the value of the driving field $H_{drive}$ for wall motion relative to other parameters of the thin film construction. That is, referring to FIG. 6, application of a magnetic drive pulse 22 having a maximum value $H_{drive}$ provides the means for propagating the domains along the film 16. However, the value of $H_{drive}$ must lie within the range of an operational margin indicated in FIG. 6 as $H_N - H_W$. That is, if $H_{drive}$ exceeds the nucleation field $H_N$, a domain will be erroneously created when only propagation is desired. On the other hand, decreasing the value of $H_{drive}$ below that of the domain wall threshold field $H_W$ would not only decrease the speed of the register, but would result in failure to provide any domain wall motion at all. Thus, for values of $H_{drive}$ greater than $H_N$ "drop-ins" result, whereas for values of $H_{drive}$ below $H_W$ "drop-outs" result.

Accordingly, since it is necessary that the value of $H_{drive}$ lie within the operational margin of previous mention, it is desirable to expand the range of the margin such that $H_{drive}$ can be made as large as possible. This allows an increase in the speed of domain wall propagation commensurate with a relatively high packing density. To this end, the invention provides the improved thin film structure 12 of FIG. 5, with its associated increase in the value of ΔH of previous mention, and expansion of the operational margin $H_N - H_W$. This allows an increase in the value of $H_{drive}$ while providing a configuration of relatively stable domain storage conditions, whereby both the speed of propagation and the packing densities may be optimized. That is, a large reduction in the value of the width W of the soft film strip 16 relative to the length L of the domain 14, allows a corresponding decrease in the value of L with the same operational margin, or provides an increase of the operational margin with the same value of L, which in turn, allows the application of a larger value of $H_{drive}$ without exceeding the value of $H_N$.

Figure 7:
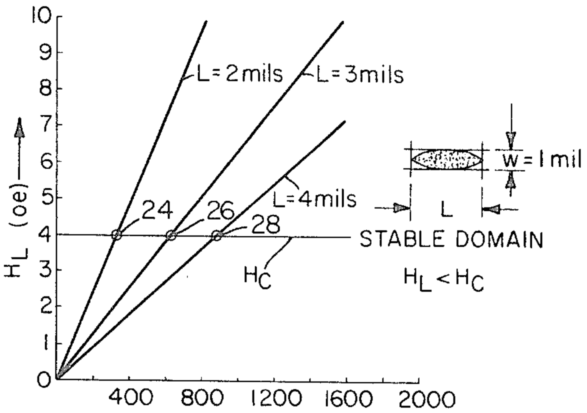
FIG. 7 is a graph of a family of curves depicting the relationships between the demagnetization field $H_L$, the film coercive force $H_c$, the domain length (L), the domain width (W) and film thickness (T).

Accordingly, as may be seen from FIG. 7, in accordance with the invention, various compromises are made between various parameters, e.g., the coercive force $H_c$ of the thin film, the width W of the thin film, the length L of the magnetic domain (and thus the packing density), and the thickness T of the thin film. As shown in FIG. 7, for three different lengths of the magentic domains, and for a chosen value of $H_c$, the relative thicknesses T of the film are determined, since the value of the demagnetizing field $H_L$ may not exceed that of the value of $H_c$. That is, the three points 24, 26 and 28 are the upper limits for the thickness T of the three depicted lengths of the magnetic domains, respectively. For purposes of readout, it is highly desirable to increase the thickness T as much as possible to thus provide more signal. As noted above, increasing the packing density is a primary advantage of the invention configuration. Obtaining the optimum packing density also requires the above mentioned compromise between the various parameters W, L, T and ($H_n - H_w$). That is if the operational margin $H_n - H_w$ is maintained the same, decreasing the width W allows a decrease in the length L of the domains 14, thus increasing the packing density.

Accordingly, in an example of establishing the various parameters of previous mention, a particular packing density is established, a width is assumed equal to 1 mil, (such width being readily obtained by existing etching processes) and $H_c$ is equal to the order of 4 oersteds. Since the length L of the domain is determined by the desired density it is then possible to determine the thickness T of the thin film for this exemplary structure. To this end, referring to FIG. 7, if L equals 4 mils, $H_c$ equals 4 oersteds, the approximate thickness of the thin film will be 900 A.

The above description of the invention has been concerned mainly with the utilization of a single layer, thin film structure. For optimum readout it is found that a double film, closed flux structure, embodying the concepts of the invention, provides enhanced readout without creating unwanted, extra, demagnetizing fields as usually generated during the readout process when utilizing single layered thin film structures. Thus, the advantages provided by the invention in the case of single film structures, also applies in the case of closed flux double film structures.

Figure 8:
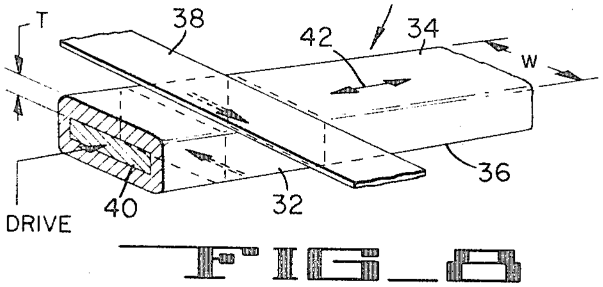
FIG. 8 is a simplified perspective view of an alternative embodiment of the invention thin film strip configuration.

Regarding more particularly a closed flux structure 30 as shown in FIG. 8, domains 32 are stored in the form of selected magnetization within a pair of thin films 34, 36 formed of magnetic material. A non-magnetic electrically conducting readout drive line 40 is disposed between the films 34, 36 and the films preferably are connected along their lateral edges to provide a closed flux structure of the type described, for example, in copending U.S. application Ser. No. 641,293 to I. Wolf, filed May 25, 1967, now U.S. Pat. No. 3,553,660 and assigned to the assignee of this application. A conductor drive line 38 is disposed transversely across the films 34, 36. The easy axes 42 of the thin films are disposed parallel with the length of the films to allow shift operation along the line. During readout of the domains, after propagation thereof along the thin films 34, 36, a readout drive of lesser magnitude may be utilized as compared to that required in a single thin film structure, whereby the extra demagnetization fields are not created in the closed flux structure. That is, the domain walls in the closed flux structure provide stray flux fields which are indicative of the true original flux, e.g., the information stored, wherein the stray flux fields can be sensed for readout purposes. Unlike single thin film structures, demagnetizing fields $H_L$ are not generated which would hamper the process of readout, while switching the film into its transverse axes.

In accordance with the concepts of the invention, decreasing the width with respect to the length of the thin films 34, 36 provides the closed flux structure with stable domains during storage conditions, in the same manner as is discussed above relative to the single thin film structure 12 of FIG. 1. Thus, both storage properties and readout processes are enhanced in the closed flux structure utilizing relatively lesser readout drive fields.

Although the invention has been described herein with respect to various embodiments, it is to be understood that various modifications may be made thereto within the spirit of the invention. Thus, it is not intended to limit the invention except as defined in the following claims.

I claim:

1. An improved geometry for a straight line thin film element for use in storing and propagating domains in thin film registers comprising; a straight constant coercivity portion adapted to store a plurality of domains for selected propagation therealong, wherein the straight strip portion comprises, a single continuous film of magnetic material of constant coercivity disposed on a substrate, with the easy axis extending parallel with the length of the strip portion, the constant coercivity portion having a a selected film thickness T, constant coercive force $H_c$, and a selected width corresponding to a domain width, wherein the domains have a width to length ratio W/L of the order of from two through one twenty-fourth with a maximum length L of the order of 6 mils, wherein the above parameters provide an operational margin $H_N$—$H_W$ within a selected range of values commensurate with the value of $H_{drive}$, $H_W$ equals the nucleation field and is greater than $H_{drive}$, $H_W$ equals the domain wall threshold field and is less than $H_{drive}$, and $H_{drive}$ equals the drive field applied to provide domain wall motion.

2. The thin film element of claim 1 wherein $H_N$—$H_W$ is of the order of from 2 to 20 oersteds, the length L of the domain is less than 6 mils, the width W of the domains and of the strip is less than 2 mils, and the associated ratio W/L is of the order of from two to one twenty-fourth.

3. The thin film element of claim 1 including a second continuous thin film disposed relative to the first film to define a pair of continuous straight superimposed thin films of magnetic material, a conductor material disposed between the pair of thin films, wherein the thin films are magnetically closed along their lateral edges to define a closed flux structure of constant coercivity having said W/L ratio.

4. The thin film element of claim 3 wherein the thin films of magnetic materials have the easy axis extending substantially transverse to the lengths thereof.

5. An improved magnetic thin film memory for storing and propagating a large plurality of magnetic domains at relatively large packing densities the combination comprising;

a plurality of straight continuous flat strips of magnetic material each including a continuous straight constant coercivity portion adapted to store a plurality of domains for selected propagation therealong, with the easy axis extending parallel with the lengths of the strip portions the constant coercivity portions each having a selected film thickness T, constant coercive force $H_c$, and a selected width corresponding to a domain width;

said domains having a width to length ratio W/L of the order of from two through one twenty-fourth with a maximum width of the order of 2 mils and a maximum length L of the order of 6 mils;

wherein the above parameters provide an operational margin $H_N$—$H_W$ within a selected range of values commensurate with the value of $H_{drive}$, wherein $H_N$ equals the nucleation field and is greater than $H_{drive}$, $H_W$ equals the domain wall threshold field and is less than $H_{drive}$, and $H_{drive}$ equals the drive field applied to provide domain wall motion;

nucleating means including a nucleating conductor magnetically coupled to one end of each strip to selectively generate a succession of magnetic domains in each; and drive means including a series of parallel drive conductors disposed substantially perpendicular across the strips of magnetic material in magnetic field bridging relation therewith for applying an associated series of propagating fields along the strips to selectively propagate the plurality of domains therealong.

* * * * *